(12) United States Patent
Sumpter

(10) Patent No.: US 6,589,002 B2
(45) Date of Patent: Jul. 8, 2003

(54) MATERIAL AND WASTE TRANSPORTATION

(76) Inventor: Derek Edward Sumpter, 3 Robinson Cottages Green Farm Lane, Shorne, Gravesend DA12 3HG (GB)

( * ) Notice: Subject to any disclaimer, the term of this patent is extended or adjusted under 35 U.S.C. 154(b) by 0 days.

(21) Appl. No.: 09/919,363

(22) Filed: Jul. 31, 2001

(65) Prior Publication Data

US 2003/0026678 A1 Feb. 6, 2003

(51) Int. Cl.$^7$ .............................. B65F 9/00; B65F 3/28; B65F 1/12; B60P 1/00
(52) U.S. Cl. .................... 414/400; 414/513; 100/229 A
(58) Field of Search ................................ 414/400, 513; 100/229 A

(56) References Cited

U.S. PATENT DOCUMENTS

| | | | | |
|---|---|---|---|---|
| 3,753,506 A | * | 8/1973 | Palmer et al. ............... | 414/513 |
| 3,799,374 A | * | 3/1974 | Weaver ................... | 414/513 X |
| 3,962,965 A | * | 6/1976 | Corompt ................. | 100/229 A |
| 4,200,422 A | * | 4/1980 | Stodt ........................... | 414/304 |
| 4,431,360 A | * | 2/1984 | Maeno ................... | 414/513 X |
| 4,677,909 A | * | 7/1987 | Beesley et al. ............. | 100/229 |
| 5,667,079 A | * | 9/1997 | Jongebloed ................. | 209/589 |

FOREIGN PATENT DOCUMENTS

| | | | |
|---|---|---|---|
| DE | 2820276 | * | 11/1979 |
| EP | 0103999 | * | 3/1984 |
| EP | 0796809 | * | 9/1997 |

OTHER PUBLICATIONS

EP 00 30 4917—Copy of European Search Report.

* cited by examiner

Primary Examiner—Steven A. Bratlie
(74) Attorney, Agent, or Firm—Raymond M. Galasso; Simon, Galasso & Frantz PLC

(57) ABSTRACT

The present invention relates to material and waste transportation, in particular including an improved routine for delivery of newsprint and the removal of waste paper. There is described a material delivery and waste collection system for a premises. The system comprises (i) providing at least two, wheeled, enclosed elongate material-carrying containers each having a floor, walls, a roof and an access door at the rear of the container. The premises have a delivery bay for transfer of materials from the rear of a first container into the premises; and at least one waste collection bay. The waste collection bay includes a compactor unit having an input adapted to receive waste material and an output for expulsion of the waste material. Mutually cooperating connecting means are provided on the compactor units and on the rear of the second container; the connecting means providing a substantially rigid connection between the output of the compactor unit and the container. Preferably, the wheeled container is in the form of a trailer of an articulated lorry.

3 Claims, 6 Drawing Sheets

MATERIAL AND WASTE TRANSPORTATION

BACKGROUND OF THE INVENTION

1. Field of the Invention

The present invention relates to material and waste transportation, in particular including an improved routine for delivery of newsprint and the removal of waste paper.

2. Description of the Prior Art

Transportation of goods by road is normally conducted using large articulated lorries having a trailer hauled by a tractor unit. Typically, having delivered its load, the lorry returns to its home depot empty. This is a waste of driver and vehicle time, being a period of zero productivity, and is also a waste of fuel, thus raising environmental concerns. The government is keen to encourage hauliers to use full trailers on the return leg of each journey. However, whilst being an admirable aim, it is, in practice, difficult to achieve, for several reasons. Products made by the concern to whom the delivery was made may not require transportation of its own goods in the direction of the lorry's home depot. Furthermore, trailers may be designed specifically for transporting a certain type of product and are not readily adaptable to carrying other goods.

In the newsprint industry, reels of newsprint are typically delivered to a printing works on a trailer with fabric side curtains carried upon a steel frame, typically known as a "Tautliner". Printing works produce a great deal of waste paper. Typically, on a continuous basis as it is produced, a compactor unit compresses waste paper into a 20 foot long bin. Typically, two bins are transported for disposal or recycling upon a single trailer. The trailer will be different from that used to deliver the newsprint. Each bin in turn must be mounted upon and demounted from the trailer using a hook lift vehicle before the contents can be disposed of. The system is generally similar to that in our copending application GB 2 307 895A. This procedure is unduly time consuming involving many movements of bins. This additionally produces a considerable amount of noise.

It is with these problems in mind, particularly with reference to the newsprint industry, that the present invention has been devised.

BRIEF SUMMARY OF THE INVENTION

According to the present invention, there is provided, in a first aspect, a material delivery and waste collection system for a premises; the system comprising (i) providing at least two, wheeled, enclosed elongate material-carrying containers each having a floor, walls, a roof and an access door mounted within a frame at the rear of the container; (ii) providing the premises with a delivery bay for transfer of materials from the rear of a first container into the premises; and (iii) providing the premises with at least one waste collection bay; wherein the waste collection bay includes a compactor unit having an input adapted to receive waste material and an output for expulsion of the waste material; the system comprising mutually cooperating connecting means provided on the compactor units and on the rear of the second container; the connecting means providing a substantially rigid connection between the output of the compactor unit and the container.

Preferably, the wheeled container is in the form of a trailer of an articulated lorry.

In another aspect, the present invention provides a trailer for an articulated lorry adapted for use in the system described above. The trailer comprises an enclosed elongate material-carrying container having a floor, walls, a roof and an access door mounted within a frame at the rear of the trailer; wherein the interior surfaces of the walls and roof are substantially flat and uninterrupted and the floor includes a plurality of longitudinally extending guide tracks; wherein further, the rear of the trailer comprises cooperative means for connecting the trailer to the output of a compactor unit. The trailer further comprises means for discharging waste material from the interior of the container.

Typically, the container is mounted at the rear of the trailer upon a chassis for pivotal movement with respect thereto. Alternatively, the container may include a tipping ram to thereby discharge the contents.

Preferably, the access door is a vertically slidable door. The frame of the door may be in the form of an external outwardly opening door. Alternatively, there may be a further external rear door provided to the trailer.

The above and other aspects of the present invention will now be described in further detail by way of example only with reference to the accompanying drawings.

DETAILED DESCRIPTION

Figure 1:
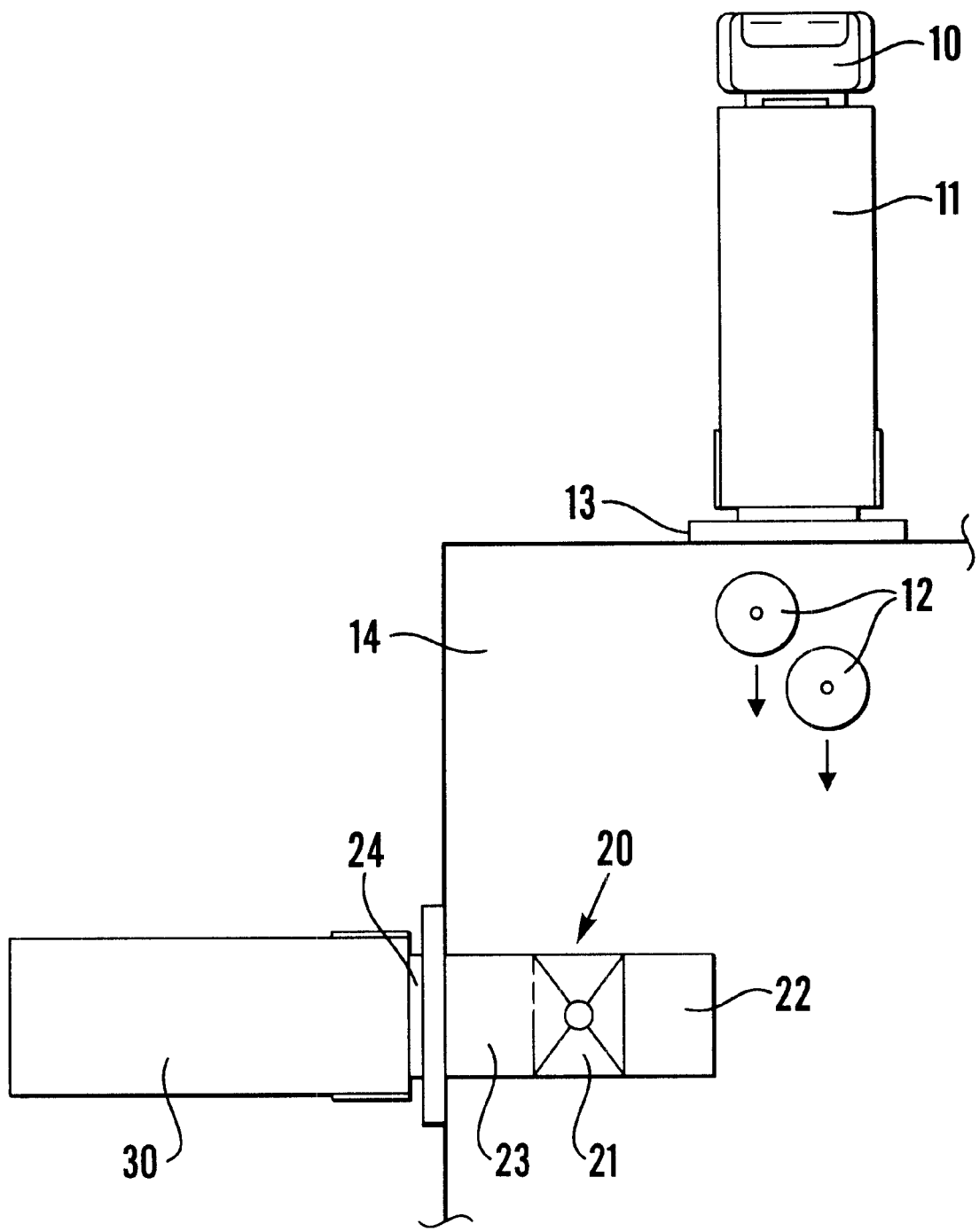
FIG. 1 is a plan view representing, schematically, the operation of an embodiment of the method of the present invention.

With reference to FIG. 1, the process of the present invention will now be explained. A lorry comprising a tractor unit 10 and a first trailer 11 carrying newsprint reels 12 reverses up to a loading bay 13, of a printing works 14 whereupon the reels are removed in a conventional manner to be used, again in a conventional manner. Newspaper waste is removed from the printing process and delivered to a conventional compressor unit 20 typically comprising a hopper 21 for receipt of the waste and an axial ram unit 22 to force the waste along discharge pathway 23 terminating in an discharge chute 24. Discharge chute 24 is received in an aperture 40 (FIG. 2) in a door 41 in the rear of a second trailer 30 of identical design to first trailer 11. Second trailer 30 is secured such that movement between the trailer 30 and discharge chute 24 is largely prevented and remains in place whilst, the compacting process is ongoing. Apeture 40 is covered when not coupled to the discharge chute 24 by means of a vertically sliding cover 42. Door 41 typically hinges from the upper edge.

The process operates as follows. A fully laden lorry arrives and discharges its load. It then proceeds to the waste exit area of the works 14 where it deposits the now empty trailer and retrieves the filled trailer which it then returns to its home depot or elsewhere for disposal.

In a typical arrangement, however, the printing works 14 will have several compressor units 20 with associated discharge pathways.

At the remote site where the waste paper is to be discharged, for example at a landfill site or recycling plant, the trailer can be tipped to discharge the waste under gravity or may include an ejector or ram piston or walking floor (not shown) which ejects the waste out.

Figure 2:
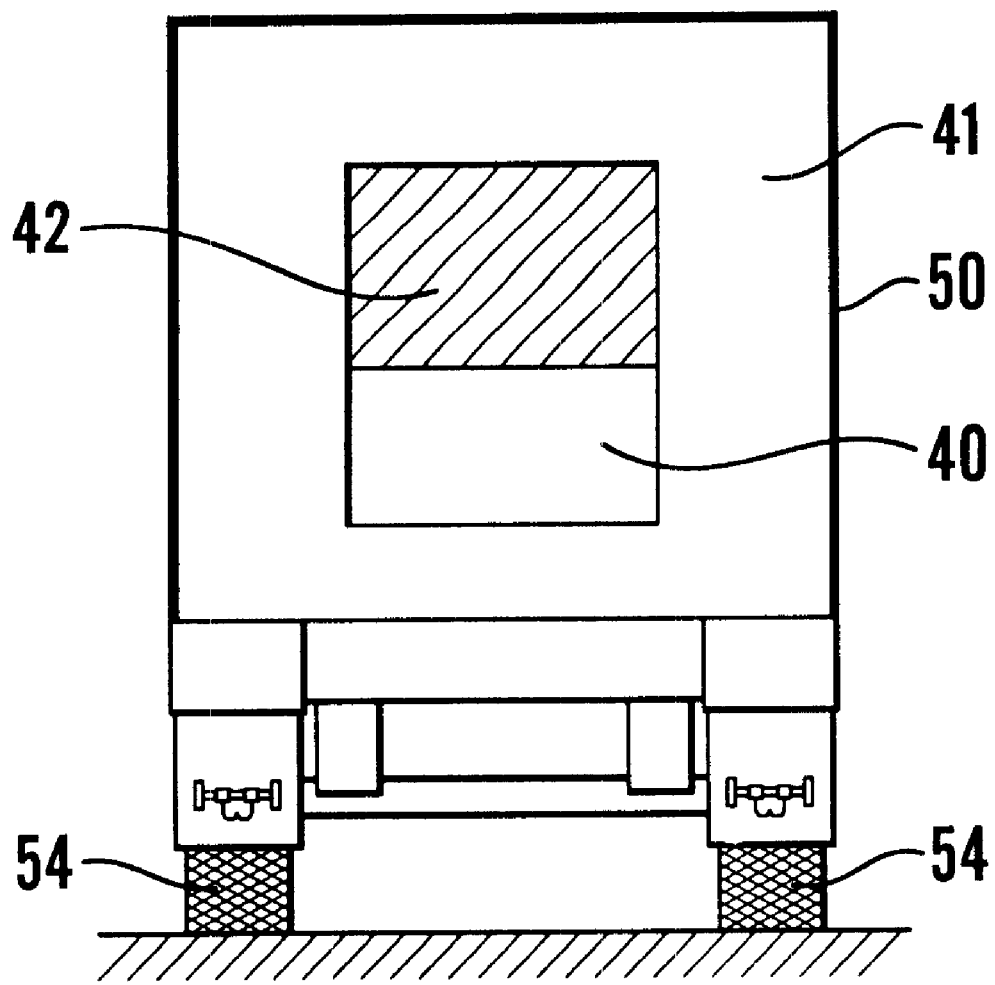
FIG. 2 is a rear view of a first embodiment of a trailer in accordance with the present invention.
Figure 3:
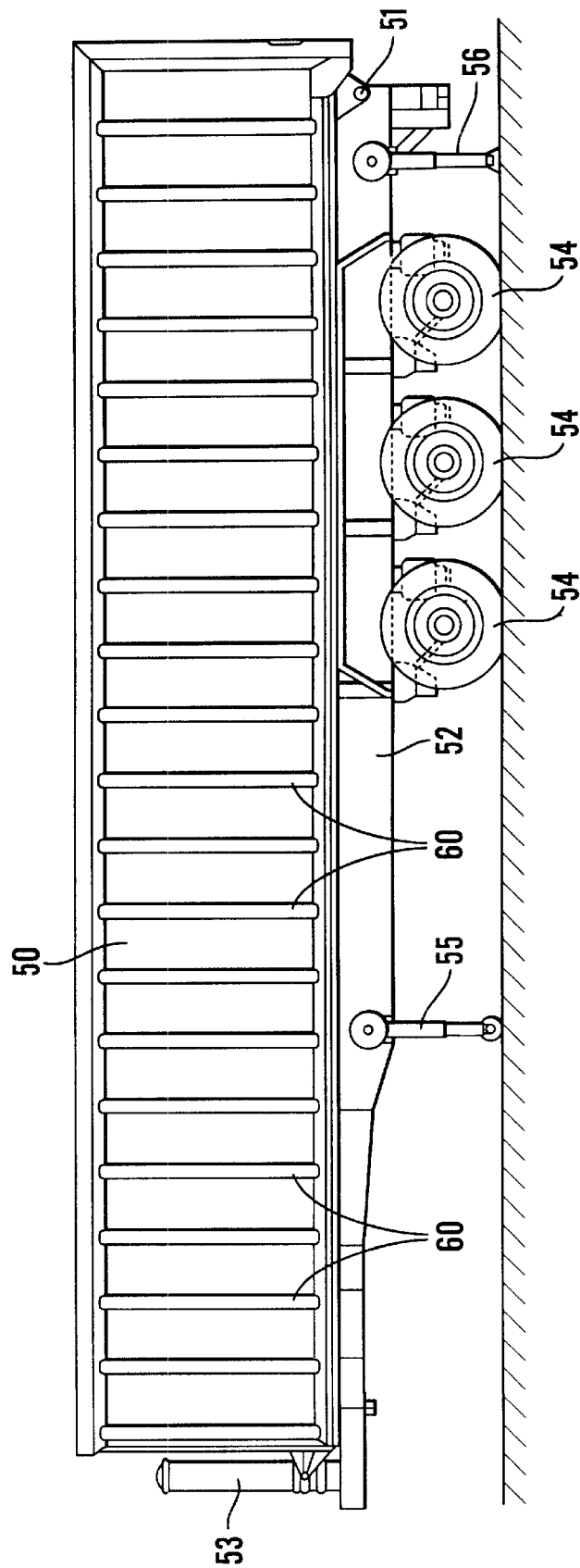
FIG. 3 is a side view of the trailer of FIG. 2.

Many features of the trailer 11,30 are largely conventional and do not need to be described in further detail. Indeed, this is a particular advantage of the present system and trailer. An example of a trailer is shown in FIGS. 2 and 3. The trailer includes a material carrying container 50 pivotally mounted at a rear hinge point upon a chassis 52. Pivotal movement is actuated by means of a pneumatic piston 53. The trailer is supported upon three pairs of road wheels 54 and, when not coupled to a tractor unit, a front wheeled support leg 55. A further wheeled support leg 56 is provided at the rear of the trailer for additional support.

Figure 4:
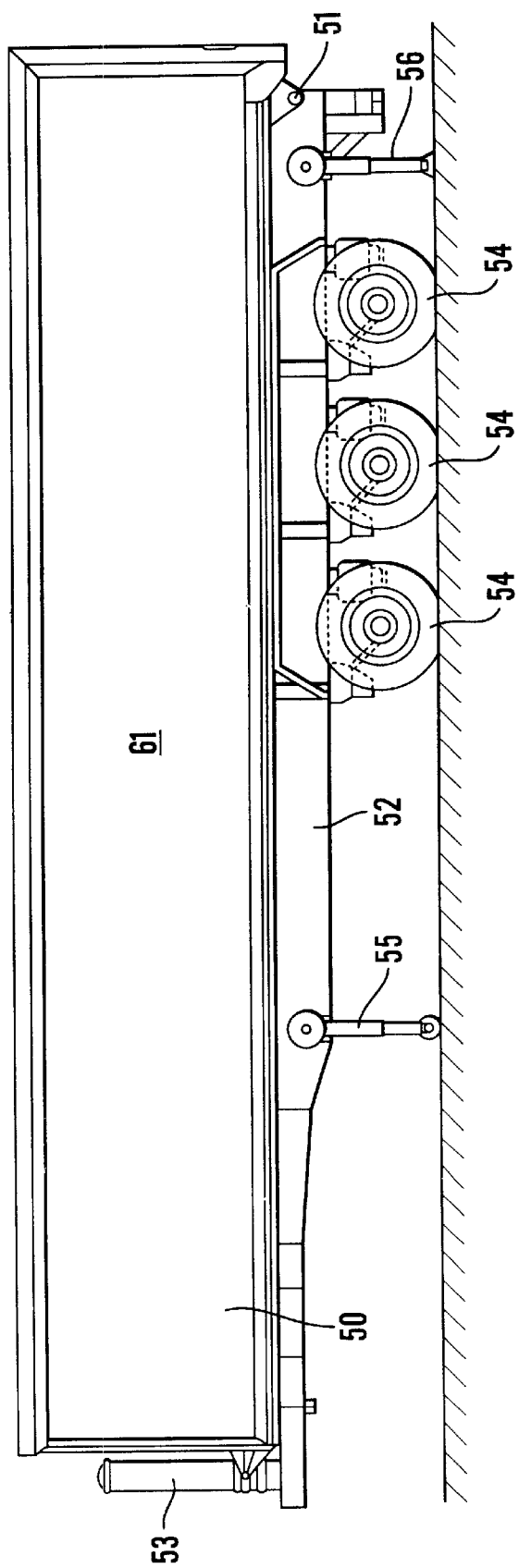
FIG. 4 is a side view of a second embodiment of a trailer in accordance with the present invention.

The container 50 is typically formed from 5 mm aluminium alloy plate and includes reinforcing members 60 spaced at approximately 400 mm centres. The embodiment shown in FIG. 4 is identical save that, for aesthetic reasons, the container is clad externally with an appropriate sheet material 61. The use of aluminium means that the container is equally suitable for the transportation of grain/cereals. Indeed the inventive system will find use in the delivery of products to, for example, supermarkets. Supermarkets produce a large quantity of paper and cardboard waste which is presently compacted into small containers in the same manner as in the waste newsprint industry. In this regard, it will be apparent that the trailer could also be refrigerated.

Figure 5:
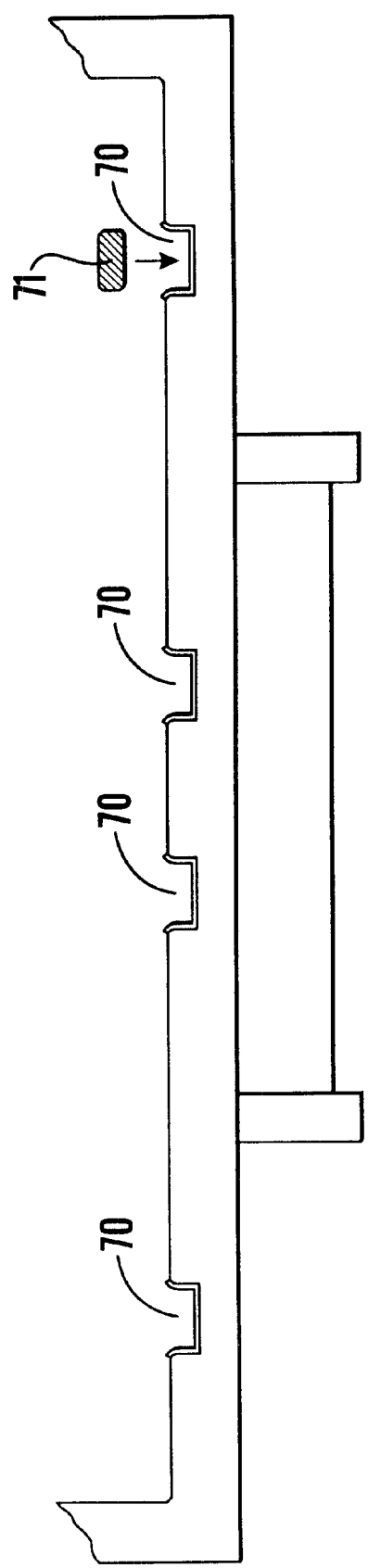
FIG. 5 is a cross-section through the floor of the trailer of FIGS. 2 and 3.
Figure 6:
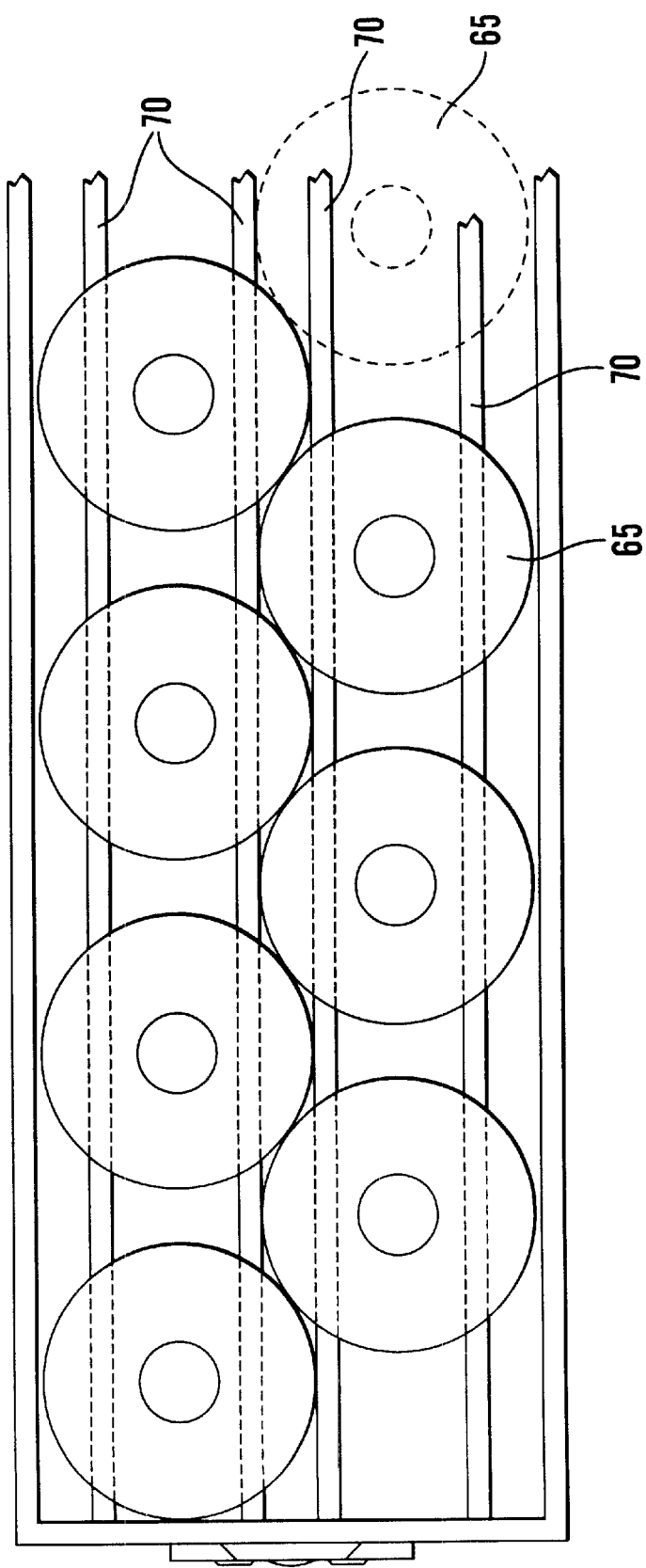
FIG. 6 is a part plan view showing an arrangement of newsprint rolls in the trailer of FIGS. 2, 3 and 5.

Typically, the container 50 is around 13 m long, 2.55 m wide and 2.5 m tall. Such dimensions allow the trailer to carry seventeen 1250 mm reels 65 of newsprint, a section of which is shown in FIG. 6. The base of the trailer is illustrated in cross-section in FIG. 5. The base includes four longitudinal channels 70 arranged in pairs. The channels assist in loading and removal of the reels 65 of newsprint. Cargo carried upon skates can slide within the channels. So that the channels 70 do not become clogged with waste paper, elongate inserts 71 can be used to fill the channels. Alternatively, the channels can simply be brushed and cleaned out after use.

The present invention reduces the number of on site operations required, avoids the need for raising and lowering heavy containers loaded with waste materials and allows removal of waste to be effected in a straightforward, quick, efficient and cost-effective manner. The present invention also significantly reduces road movements, in ideal cases by 50%. Additionally, in the preferred embodiment, the safety of road delivery is enhanced by the metal construction of the trailer.

What is claimed is:

1. A raw material delivery and waste collection system for a premises; the system comprising (i) providing at least two essentially identical, wheeled, enclosed elongate material-carrying containers each having a floor, walls, a roof and access means mounted within a frame at a rear of said container, (ii) providing the premises with a delivery bay for transfer of raw materials from the rear of a first said container into the premises; and (iii) providing the premises with at least one waste collection bay; wherein the waste collection bay includes a compactor unit having an input adapted to receive waste material and an output for expulsion of said waste material; the system comprising mutually cooperating connecting means provided on the compactor unit and on the rear of a second said container; said connecting means providing a substantially rigid connection between the output of the compactor unit and the second said container.

2. A system as claimed in claim 1 wherein the wheeled container is in the form of a trailer of an articulated lorry.

3. A trailer for an articulate lorry wherein the trailer comprise an enclosed elongated material-carrying container having a floor, walls, a roof and an access door mounted within a frame at a rear of the container; wherein the interior surfaces of the walls and roof are substantially flat and uninterrupted and the floor includes a plurality of longitudes extending guide tracks; wherein the rear of the container comprises cooperative means for connecting the container to the output of a compactor unit; wherein the trailer further comprises means for discharging waste material from an interior of the container and wherein the container is adopted for enabling said guide tracks to receive elongated inserts therein when said means for discharging is positioned adjacent to a front portion of the container.

* * * * *